G. A. AND C. HEINEKE.
MACHINE FOR CLEANING FURS.
APPLICATION FILED MAY 24, 1918.
1,377,247.
Patented May 10, 1921.
4 SHEETS—SHEET 1.
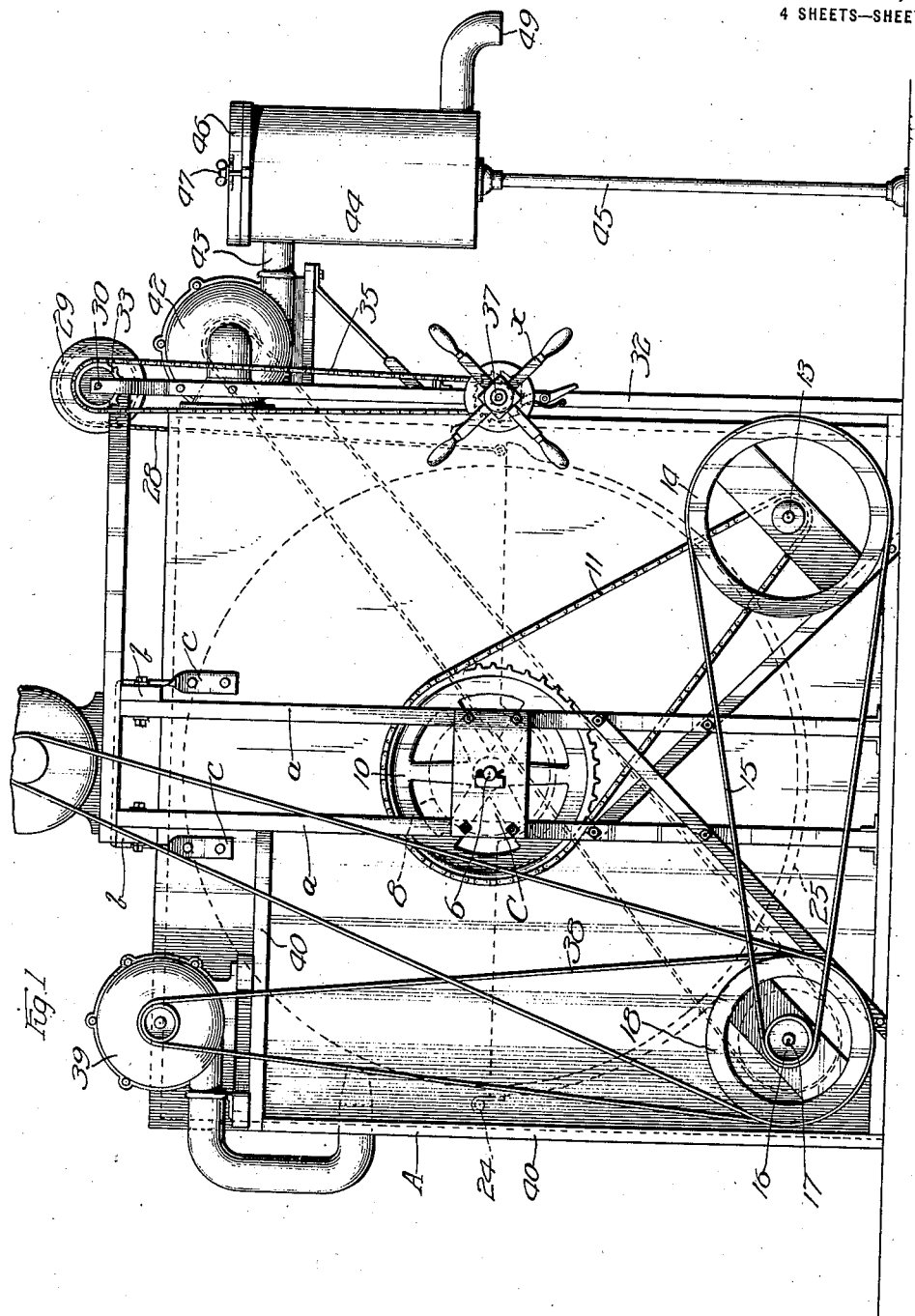

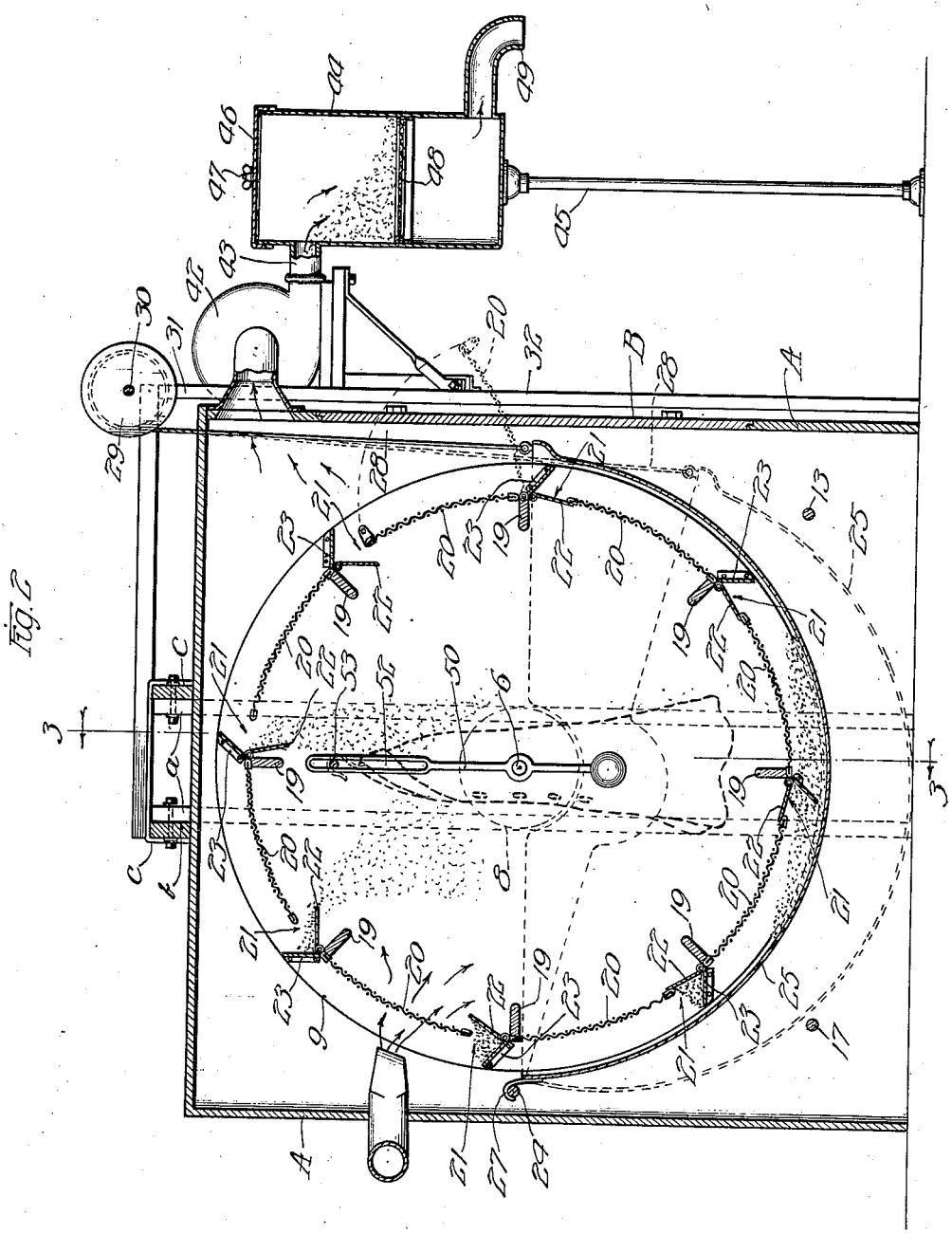

G. A. AND C. HEINEKE.
MACHINE FOR CLEANING FURS.
APPLICATION FILED MAY 24, 1918.
1,377,247.
Patented May 10, 1921.
4 SHEETS—SHEET 3.
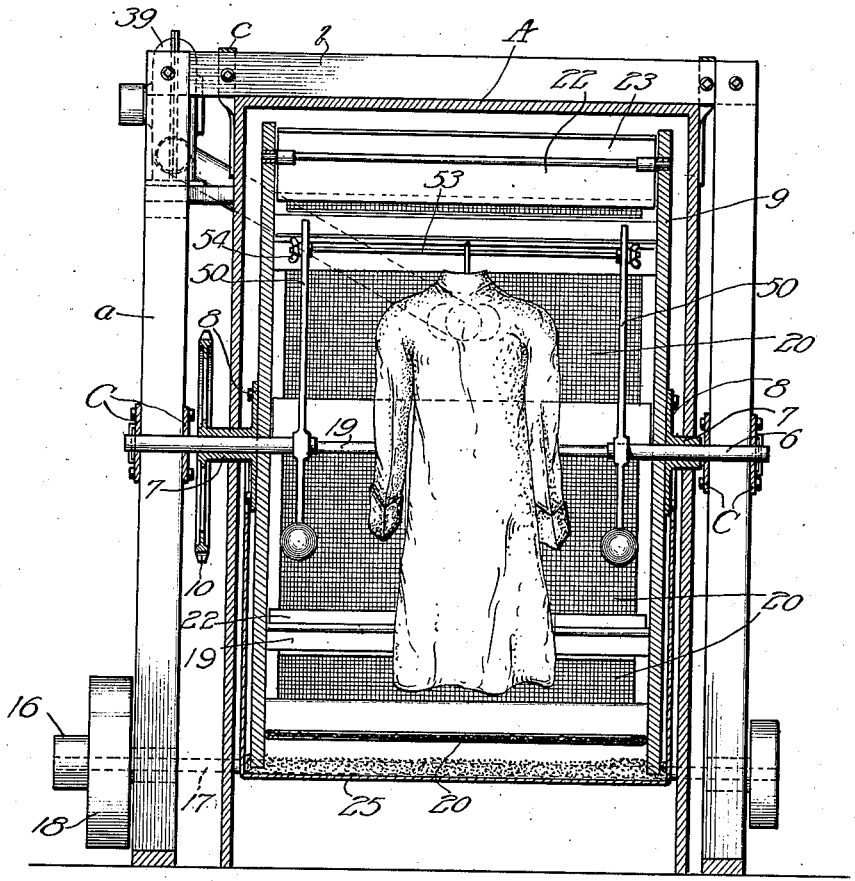

G. A. AND C. HEINEKE.
MACHINE FOR CLEANING FURS.
APPLICATION FILED MAY 24, 1918.
1,377,247.
Patented May 10, 1921.
4 SHEETS—SHEET 4.
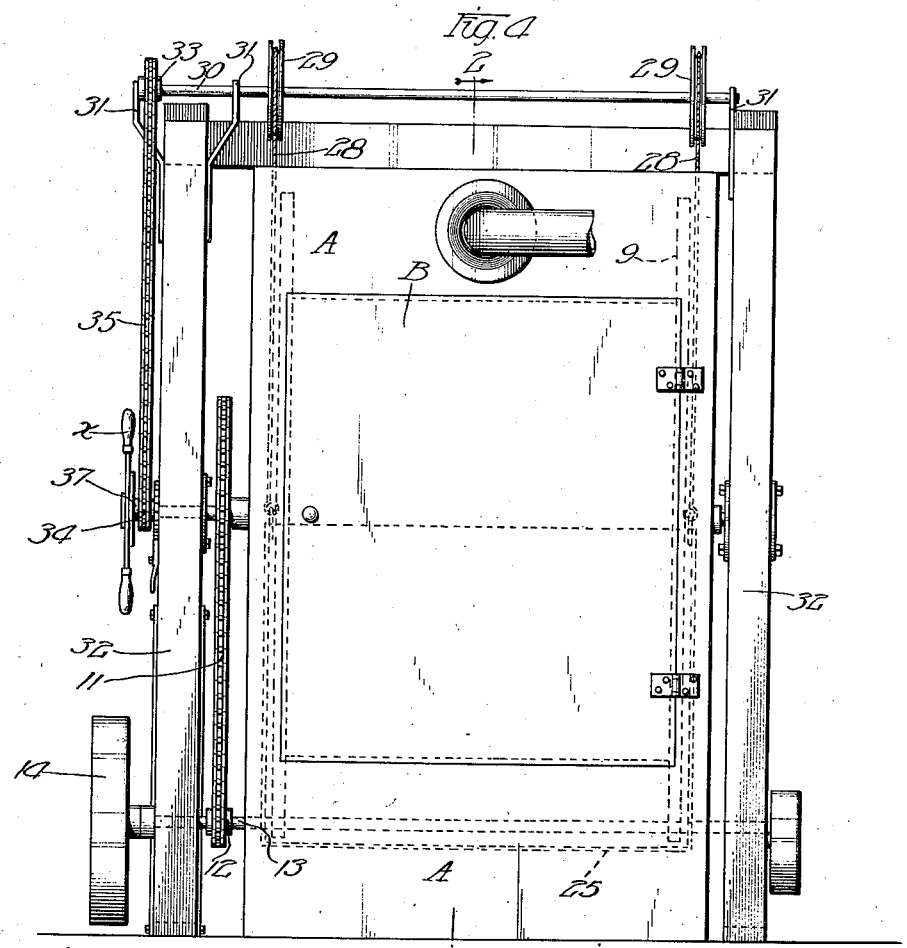
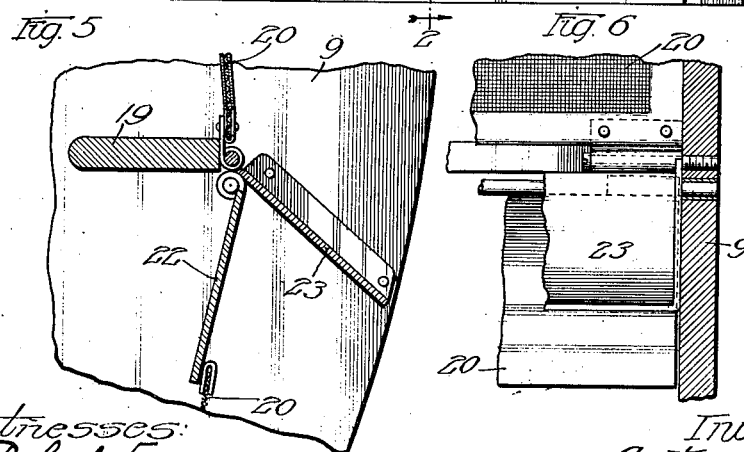
Inventors
Gustave A. Heineke
Carl Heineke

UNITED STATES PATENT OFFICE.

GUSTAVE A. HEINEKE AND CARL HEINEKE, OF CHICAGO, ILLINOIS.

MACHINE FOR CLEANING FURS.

1,377,247.  Specification of Letters Patent.  Patented May 10, 1921.

Application filed May 24, 1918. Serial No. 236,400.

*To all whom it may concern:*

Be it known that we, GUSTAVE A. HEINEKE, a citizen of the United States, and CARL HEINEKE, a subject of the German Empire, residing at Chicago, in the county of Cook and State of Illinois, have invented new and useful Improvements in Machines for Cleaning Furs, of which the following is a full, clear, and exact description.

Furs, particularly when used in the construction of fur garments, naturally collect more dirt and grease than almost any other material, and, when it is cleansed by the apparatus heretofore employed, more or less germ laden dirt and dust is thrown off into the surrounding atmosphere and make it very unhealthy. Heretofore the apparatus employed consisted, principally, of a closed revoluble drum in which the furs were placed together with a quantity of saw dust that had previously been impregnated with some cleansing material, such as gasolene and ammonia, and then the drum was revolved at a suitable speed for a period of time sufficient to cleanse the fur. The fur was then removed from the drum and thoroughly shaken and combed until the saw dust had all been removed. Of more recent years in addition to the closed drum a revoluble drum having a wire screen circumference was employed to remove the saw dust, but whichever way the saw dust was removed, considerable dust and hair laden air was obtained which made it necessary to place the drum or drums in a separate room or compartment from which the air was discharged into the outer atmosphere by an exhaust fan or other means.

The object of our invention is to provide a machine which it is not necessary to place in a separate room, which thoroughly cleanses the fur and then removes the saw dust and other material employed to do the cleaning therefrom and removes all dust and dirt from the machine without permitting the dust, dirt and hair from escaping into and contaminating the surrounding atmosphere. It is a further object of our invention to do all this without removing the fur from the drum and without the employment of labor for transferring the garments from one drum to another, or for shaking and agitating the furs after they have been cleansed in an inclosed drum. These and other objects are accomplished by our improvements by the means hereinafter fully described, and as particularly pointed out in the claims.

In the drawings:

Figure 1 is a side view of our invention.

Fig. 2 is a longitudinal central section thereof.

Fig. 3 is a transverse vertical section taken on dotted line 3—3, Fig. 2.

Fig. 4 is an end view of Fig. 1 and

Figs. 5 and 6 are detail views.

Referring to the drawings, A represents a rectangular cabinet or casing which is closed on all sides, except at the front, which is provided with a doorway that is closed by a suitable door B. Alongside of each side of this cabinet at about its center of length, are two uprights $a, a$, that are connected at their top ends by cross-bars $b, b$, that cross the roof of said cabinet and are secured to the same by suitable straps $c, c$. At the center of height of these uprights each pair is connected by two corresponding plates C, C, and midway between said uprights these plates are provided with openings for the reception of the outer ends of stationary shafts 6, 6, which latter are secured in said plates in such manner as to prevent their revolving. Shafts 6, 6, extend through hubs or bosses 7, 7, which latter extend through suitable openings in the side walls of the cabinet and have their inner ends provided with circumferential flanges 8 that are bolted or otherwise secured concentrically to the closed sides of a drum 9.

At one side of the machine, between the uprights and the adjacent side of the cabinet, boss 7 is provided with a comparatively large sprocket-wheel 10, and this sprocket-wheel is driven through the medium of a chain 11 by a small sprocket 12 securely mounted upon the extended adjacent end of a transverse shaft 13, which latter is driven through the medium of a large pulley 14 and belt 15 by a sheave 16 on the end of a transverse drive-shaft 17. Drive-shaft 17 has a pulley 18 securely mounted thereon which is driven by a suitable motor or other source of power.

Drum 9 consists of two closed circular sides that are connected at points removed about four or five inches from their peripheries by equidistant cross-bars 19, 19, and between each pair of cross-bars said sides are connected by peripheral screens 20 which are of such dimensions that the rectangular frames thereof are secured at one end to, say, the right hand side of one cross-bar and have their opposite ends terminate and fall short of the left hand side of the next transverse bar and leave a transverse elongated feed opening 21 between the same and said last mentioned bar. These bars have suitable trap-doors 22 hinged to their outer edges next the transversely elongated openings 21, and these trap-doors are of such dimensions that when they are at the bottom of the drum they will gravitate into the position shown in Fig. 2 of the drawings and close said feed openings. Each of feed openings 21 have a shovel 23 coöperating therewith that consist of transverse blades whose ends are suitably secured to the sides of the drum. These shovels project at an angle of say 140° from the outer edges of bars 19 toward said openings. When the shovels travel through the hopper, hereinafter more fully described, they scoop up saw dust therefrom and carry the same and when above the horizontal plane of the axis of the drum the weight of the saw-dust and the current of air from blower 39, hereinafter referred to, causes said saw-dust to open said trap-doors 22 and beat against the furs or fur garments within the drum.

At the rear of the cabinet in about the same horizontal plane as the axis of the drum is a transverse rod 24 whose ends are secured in the sides of the cabinet. The lower part of the cabinet has a hopper 25 therein, the width of which is slightly greater than that of the drum and the bottom of which is, preferably, semi-circular and struck from a radius slightly greater than that of the drum. The rear upper end of this hopper is provided with rearwardly projecting hooked hangers 27, and these hangers are mounted on and are pivotally retained by shafts 24. This hopper is so positioned with relation to the drum that when raised to its uppermost position its bottom will be substantially concentric to the axis of said drum. This hopper is raised by means of cables 28, 28, secured to the upper corners of the front end thereof adjacent the front of the cabinet. These cables extend up through openings in the top of the cabinet to and around concaved wheels 29, which latter are securely mounted upon a transverse shaft 30 that is journaled in suitable standards 31 that are secured to and project up from the upper ends of posts 32, 32 at the vertical corners of the front end of the cabinet. Near one end shaft 30 has a small sprocket-wheel 33 secured thereto which is connected to a smaller sprocket 34 by means of a chain 35. This sprocket 34 is secured to a disk which ties the arms of a hand wheel $x$ together, which latter is mounted on a suitable stationary shaft or spindle 37 that is permanently secured to and projects from the side of the cabinet about midway the height of the front end thereof.

Drive pulley 18 is wide enough to accommodate a narrow belt 38 on its perimeter and drives a blower 39 mounted on the plate of a frame-work 40 extending rearwardly from uprights $a$, $a$. This blower drives a strong current of air into the rear end of the cabinet which passes through the drum and discharges through an exit pipe leading from the front end of the cabinet above the door to an exhaust fan 42, which latter is driven by a belt and pulley connecting with shaft 17 and discharges through the medium of a pipe 43 into an exhaust tank 44.

Exhaust tank 44 consists of a cylindrical sheet metal casing the closed bottom of which is supported upon the upper end of a post 45. The upper end of this tank is closed by a removable cover 46, which is secured in position by means of a spider-clamp 47. About its center of length this tank is provided with a wire screen diaphragm 48 and near the bottom, said tank has a discharge pipe 49 to which a bag or other receptacle may be secured so as to catch the discharge therefrom.

The inner ends of stationary shafts 6, 6, extend into the drum a short distance and rods 50 mounted upon these inner extensions which have openings therein through which said shaft can pass and have weights secured to their lower ends so as to maintain them in a vertical position. The upper portions of these rods are provided with vertically elongated slots 52 through which the reduced ends of a transverse tie-bar 53 extend. The reduced portions of bar 53 are screw-threaded, and the said bar is clamped in position at any distance from the axis of stationary shafts 6 within the range of slots 52 by means of thumb nuts 54. The weights on the lower ends of rods 50 are sufficient to keep them in a vertical position when the fur or fur garments are hung by means of ordinary coat hangers on bar 53 within the drum.

In operation, the door of the cabinet is opened and then hopper 25 is lowered as far as it will go. Saw-dust impregnated with suitable cleaning material is then poured into the hopper and then the hopper is raised to the limit of its upper movement as far as it can be made to go by turning hand-wheel 36, shaft 37, concaved wheels 29 and raising cables 28. The trap-door in the periphery of the drum is then opened and the furs thrown in, or if a large garment it is hung on bar 53 and then the trap-door is closed again and the door of the cabinet closed. The power is then turned on to drive pulley 18, and through it the transmission mechanism which turns the drum, the blower fan and exhaust fan. As the drum revolves, shovels 23 scoop up the saw-dust from the hopper and when the said shovels are moved to a position above the horizontal plane of the axis of the drum the weight of the saw-dust causes the saw-dust to discharge into and over the furs or garments hung within the drum. Continued raining of the saw dust over the furs and garments for a sufficient length of time thoroughly cleanses the fur and when this has been accomplished to the satisfaction of the operator, the hopper is lowered to the lower limits of its movement through the same devices that are used to raise it, and the cabinet is opened and the trap-door of the drum is opened and a quantity of sponges is thrown into the same. The trap-door is again closed and locked. The cabinet door is again closed and power is then applied to the machine to revolve the drum. As the drum revolves the sponges, just referred to, are raised by transverse bars 19, 19, and thrown upon and against the furs, and without injuring the furs they will beat the saw-dust out of the furs and garments, and the saw-dust gravitates down through the screened perimeter of the drum into the hopper. This continued beating of the furs by the sponges for a sufficient length of time will cause not only the saw-dust to be thoroughly beaten out of the furs but polishes them. When this result has been accomplished to the satisfaction of the operator the machine is stopped, the door of the cabinet is opened and the furs and fur garments thoroughly cleansed are removed from the hinged screen trap-door.

It is apparent that when a number of loose furs and also fur garments are introduced into the drum and subjected to the cleaning process just described the means for hanging said garments are necessary or at least desirable, but if loose furs alone are introduced into the drum said hanging devices could be dispensed with. We, therefore, desire to be considered as claiming the drum and other mechanism connected with the same for cleansing furs, etc., with or without the use of said suspended devices.

What we claim as new is:—

1. In a machine of the kind specified, the combination with a closed rotatable drum having a foraminous periphery, a receptacle for containing saw-dust in which the lower part of said drum moves, means carried by said drum for raising said saw-dust and discharging into the upper part of said drum and a valve arranged adjacent to said means which is closed during its movement in the receptacle.

2. In a machine of the kind specified, the combination with a closed rotatable drum having a foraminous periphery, a receptacle for containing saw-dust in which the lower part of said drum moves, and means carried by said drum for raising said saw-dust and discharging into the upper part of the same and a valve coöperating with said means and controlling the discharge of the sawdust into the drum.

3. In a machine of the kind specified, the combination with a closed cabinet, of a rotatable drum journaled therein and having a foraminous periphery having a series of openings therein, a receptacle for containing saw-dust, said drum and receptacle being relatively movable from and toward each other, means carried by said drum which when said drum and receptacle are nearest together convey saw-dust up and discharge it into the upper part of said drum and when farthest apart cease to convey saw-dust.

4. In a machine of the kind specified, the combination with a closed cabinet, of a revoluble drum journaled therein having a foraminous periphery, and a series of openings in said periphery, a series of transversely disposed peripheral shovels carried by said drum, a receptacle adapted to hold saw-dust in which the lower portion of said drum moves and the shovels dig into said saw-dust, and means for controlling the discharge of the saw-dust from said shovels.

5. In a machine of the kind specified, the combination with a closed cabinet, of a revoluble drum journaled therein having a foraminous periphery and a series of openings in said periphery, a series of transversely disposed peripheral shovels carried by said drum, a receptacle adapted to hold saw-dust in which the lower part of said drum moves and the shovels dig into said saw-dust, and means for raising and lowering said receptacle.

6. In a machine of the kind specified, the combination with a closed rotatable drum having a foraminous periphery, a receptacle for containing saw-dust in which the lower part of said drum moves, means carried by said drum for raising said saw-dust and discharging into the upper part of the same, means controlling the discharge of said saw-dust from the raising means, and devices for creating a current of air through said cabinet.

7. In a machine of the kind specified, the combination with a closed cabinet, of a rotatable drum journaled therein and having a foraminous periphery having a series of openings therein, devices for creating a current of air through said cabinet and drum, a receptacle for containing saw-dust, said drum and receptacle being relatively movable from and toward each other, means carried by said drum which when said drum and receptacle are nearest together conveys saw-dust up and discharges it into the upper part of said drum and when farthest apart ceases to convey saw-dust.

8. In a machine of the kind specified, the combination with a rotatable drum having a foraminous periphery, a receptacle for containing saw dust in which the lower part of said drum moves, means carried by the drum for raising said saw dust and discharging into the upper part of said drum and means arranged within the drum for supporting the article to be cleansed.

9. In a machine of the kind specified, the combination with a closed cabinet, of a rotatable drum journaled therein, and having a foraminous periphery, a receptacle for containing cleansing material, means for conveying the cleansing material from the receptacle into the drum, said means including an element which is closed when adjacent to the bottom of the receptacle and openable when near the top thereof, and means for creating a current of air through the cabinet and drum, an exhaust device communicating with the cabinet and having a container associated therewith.

In witness whereof we have hereunto set our hands this 13th day of May, 1918.

GUSTAVE A. HEINEKE.
CARL HEINEKE.

Witnesses:
FRANK D. THOMASON,
FLORENCE MITCHELL.